(12) United States Patent
Kyomasu et al.

(10) Patent No.: US 8,898,178 B2
(45) Date of Patent: Nov. 25, 2014

(54) SOLUTION MONITORING SYSTEM

(75) Inventors: Junko Kyomasu, Tokyo (JP); Yu Kuratake, Tokyo (JP); Jin Ho Jeon, Seoul (KR); Makoto Yamagishi, Tokyo (JP); Daniel Moffitt, Tokyo (JP); Fumiyuki Maeyama, Tokyo (JP); Ryogo Kanatani, Tokyo (JP); Hirokazu Sawada, Tokyo (JP); Nobuko Miwa, Tokyo (JP); Junko Tanaka, Tokyo (JP); Yasufumo Shiraishi, Tokyo (JP); Sachio Kono, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 13/569,166

(22) Filed: Aug. 7, 2012

(65) Prior Publication Data

US 2013/0159326 A1    Jun. 20, 2013

Related U.S. Application Data

(60) Provisional application No. 61/576,325, filed on Dec. 15, 2011.

(51) Int. Cl.
*G06F 7/00*      (2006.01)
*G06F 17/30*     (2006.01)

(52) U.S. Cl.
USPC ........................................ 707/754

(58) Field of Classification Search
USPC ............ 706/50; 707/737, 754; 717/126, 127, 717/177, 178
See application file for complete search history.

(56) References Cited

U.S. PATENT DOCUMENTS

| | | | |
|---|---|---|---|
| 8,180,724 B1 * | 5/2012 | Qureshi et al. ................. | 706/50 |
| 2008/0126858 A1 * | 5/2008 | Barras ............................. | 714/25 |
| 2009/0276771 A1 * | 11/2009 | Nickolov et al. ............. | 717/177 |
| 2010/0070448 A1 * | 3/2010 | Omoigui ......................... | 706/47 |
| 2010/0125477 A1 * | 5/2010 | Mousseau et al. ................ | 705/7 |
| 2010/0281458 A1 * | 11/2010 | Paladino et al. ............. | 717/106 |
| 2011/0112974 A1 * | 5/2011 | Hinton et al. ................. | 705/317 |
| 2011/0126192 A1 * | 5/2011 | Frost et al. .................... | 717/178 |
| 2011/0145657 A1 * | 6/2011 | Bishop et al. ................ | 714/47.1 |
| 2011/0225461 A1 * | 9/2011 | Wookey ....................... | 714/38.1 |
| 2013/0054601 A1 * | 2/2013 | Whitlock et al. ............. | 707/737 |

* cited by examiner

*Primary Examiner* — Robert Beausoliel, Jr.
*Assistant Examiner* — Nicholas Allen
(74) *Attorney, Agent, or Firm* — Steve Crocker; Jim Ross; Micky Minhas

(57) ABSTRACT

A solution monitoring system is provided for gathering, filtering, and analyzing information associated with solutions for managing monitoring, upgrades, and migrations. Telemetry may be recorded for various types of solution events and various properties of solutions as part of an add-in intelligence. Furthermore, add-in management tools are provided for administrators and end users.

20 Claims, 13 Drawing Sheets

Event Viewer

Refresh

| Date / Time | Event ID | Level | Application | Title | Explanation | More Info |
|---|---|---|---|---|---|---|
| 2011/10/21 18:30 | 10103 | | Excel | OM Change: Application.xxxx | Application.xxxx will return the hanlde o... | Click HERE |
| 2011/10/24 0:00 | 1 | | Word | Document loaded | | |
| 2011/10/25 0:00 | 1 | | Word | Document loaded | | |
| 2011/10/26 0:00 | 7 | | Word | Add-in was loaded | | |
| 2011/10/27 13:00 | 3 | | PowerPoint | Document loaded | | |
| 2011/10/28 0:00 | 1 | | Excel | OM Change: Application.xxxx | Application.xxxx will return the hanlde o... | Click HERE |
| 2011/10/31 0:00 | 10102 | | Word | Changes to the name of top level ot... | In the word 2007 object model, xxxx.xx... | Click HERE |
| 2011/11/1 0:00 | 10102 | | Word | Changes to the name of top level ot... | In the word 2007 object model, xxxx.xx... | Click HERE |
| 2011/11/2 0:00 | 10102 | | Word | Changes to the name of top level ot... | In the word 2007 object model, xxxx.xx... | Click HERE |
| 2011/11/3 0:00 | | | | | | |

*FIG. 4*

SOLUTION MONITORING SYSTEM

CROSS REFERENCE TO RELATED APPLICATIONS

This application claims the benefit of U.S. Provisional Patent Application Ser. No. 61/157,325 filed on Dec. 15, 2011. The disclosure of the provisional patent application is hereby incorporated by reference for all purposes.

BACKGROUND

With the proliferation of computing and networking technologies, a number of business, productivity, and similar software solutions are used widely by individuals and groups. Compared to the conventional local application model, where each user had individually installed applications, the more common usage model today includes hosted (e.g., cloud-based) applications, data management tools, or even operating systems. Typically, a managing entity may provide and oversee multiple facets of software based solutions including multiple applications for a wide range of end users.

Because innovation is high paced in software world, user needs change rapidly, and competition is strong, new programs and features for existing programs (for example, to address user demands, and/or take advantage of newer hardware platforms) are constantly developed by software providers. While updates, upgrades, and other enhancements are typically desired, in a hosted environment (or even a manufacturer-to-user model), frequent upgrades may not be practical or feasible in some cases. For example, service providers may spend substantial periods to upgrade to a new version because of lack of visibility into what solutions (e.g., document files, add-ins, web extensions) are actively used by end uses, which ones are the business solutions that need to be kept active with new version of, where the compatibility issues may exist and how to remediate them, etc.

Information Technology (IT) administrators typically need to spend substantial time to make sure that solutions are ready for an upgrade. For example, a list of solutions may need to be created to understand how many solutions need to be tested and remediated for version compatibility. Solution owners (people responsible for groups of users) may be surveyed, etc.

An add-in is a set of software components that adds specific abilities to a larger software application. Add-ins enable customization of the functionality of an application. For example, add-ins are commonly used in web browsers to play video, scan for viruses, and display new file types. A host application may provide services which an add-in can use, including a way for add-ins to register themselves with the host application and a protocol for the exchange of data with add-ins. Add-ins depend on the services provided by the host application and do not usually work by themselves. In conventional systems, an IT administrator may not be able to manage which add-in are loaded with an application in a user's computer, block or force loading of particular add-ins. To manage add-ins, an administrator may need to learn which add-ins are commonly used, have loading errors, or have slow performance.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to optimized gathering of solution inventory across an organization, Solution inventory data may be filtered by customized tags that indicate departments, groups, locations, user roles, etc. to analyze the collected data. Data may also be filtered for certain periods of time. Error events, compatibility issues for specific solutions may be recorded system-wide or on client machines to make system operations predictable for end users as well as for administrators. In some examples, user experience tools may be provided for users to test and remediate the solutions and for administrators to plan and manage upgrades. Client/server systems may be scaled to support large numbers of clients by simply adding processing servers. Compatibility issues may be detected in customer-provided or internal software at solution runtime with usage data, such as how frequently the inventoried item is actually used, being employed in monitoring, upgrades, and/or migration.

According to other embodiments, a telemetry logging system may record various types of solution events (e.g., loads or errors) and various properties of solutions as part of an add-in intelligence. An event API may be employed to detect potential compatibility issues of solutions and a framework may be used to monitor usage of applications' object models to detect potential compatibility issues of solutions. Logic may be provided to associate telemetry events with solutions along with logic for recording solution sessions and associating events with sessions.

According to further embodiments, add-ins may be managed using registry keys, where performance information associated with add-ins such as usage, issues, load behavior, load performance may be collected to enable a user to decide which add-ins to manage. Users may be enabled to create scripts based on add-in selections from management list(s), which may, in turn, create group policy objects.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF DRAWINGS

FIG. 4 illustrates an example event viewer user interface screenshot, where inventory, error, and compatibility information on a client machine is made available for end users with work-around information in an end user tool;

DETAILED DESCRIPTION

As briefly described above, information associated with solutions may be gathered, filtered, and analyzed for managing monitoring, upgrades, and migrations. Telemetry may be recorded for various types of solution events and various properties of solutions as part of an add-in intelligence. Furthermore, add-in management tools may be provided for administrators and end users.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Figure 1:
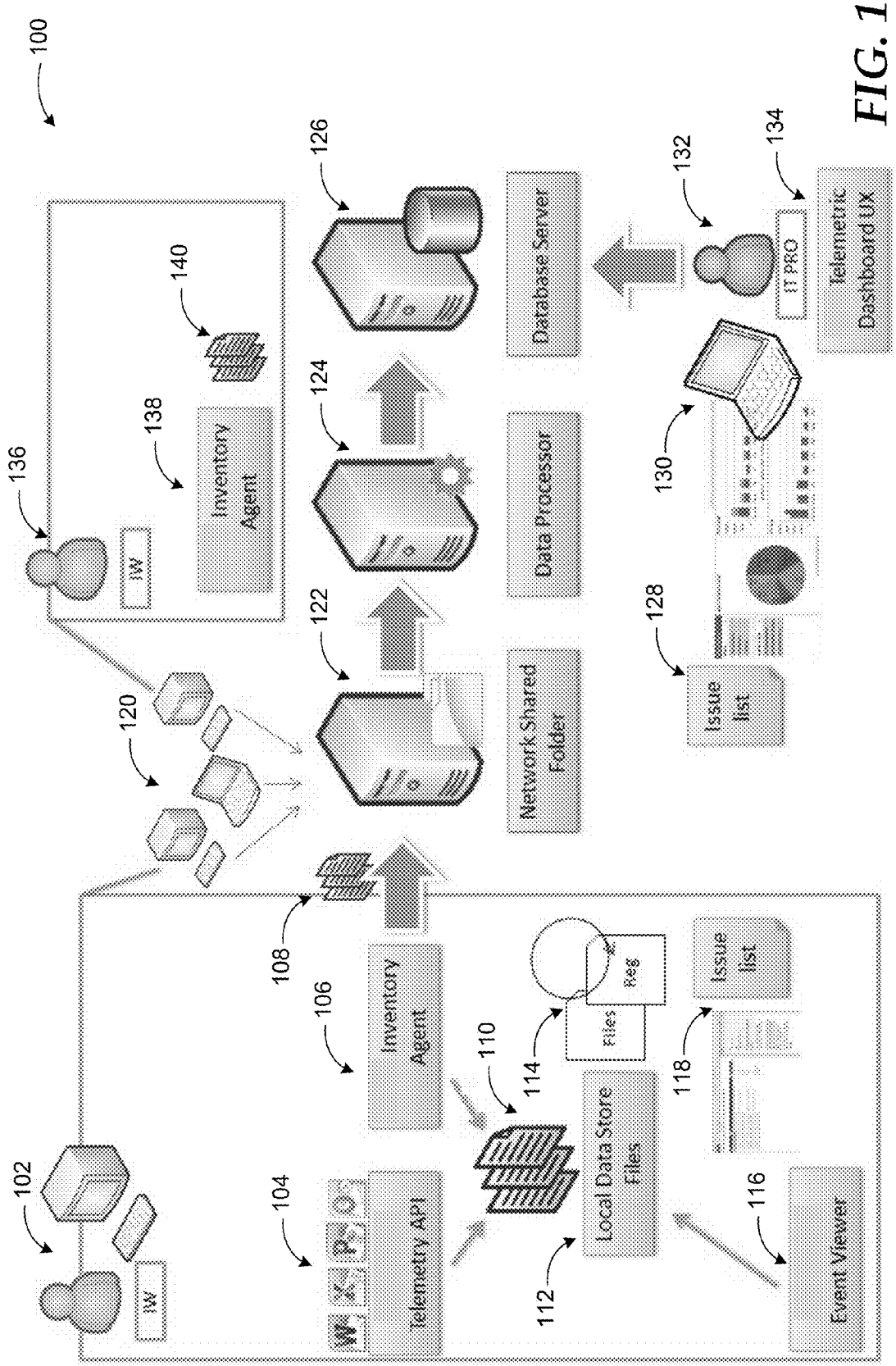
FIG. 1 illustrates an example telemetric dashboard architecture for a solution monitoring system according to some embodiments.

FIG. 1 illustrates an example telemetric dashboard architecture for a solution monitoring system according to some embodiments in diagram 100.

In a system according to embodiments, an agent 106 or 138 installed on a client machine 102 or 136 may collect inventory from the registry and the file system 114. The agent 103, 138 may periodically execute and collect a list of most frequently used (MRU) documents, installed add-ins, solutions (110) registered in the startup folders that are loaded during booting of applications and are therefore frequently used by end users or commonly shared in a specific organization. In addition to MRU documents, add-ins, and solutions, the agent may collect user information such as user name, computer name, joined domain to identify the user in the dashboard, and also collect details of the hardware/software information such as CPU type, memory, display resolution, OS version, solution version etc. The agent 106, 138 may make a record of the inventory data with the basic metadata of solutions such as solution name, size, file path, publisher, etc. to one or more files at a local data store 112. The agent 106, 138 may also build a solution inventory table on a client machine that can be used by multiple components.

Telemetry inventory logging may be another component that reads/writes inventory data to a local data store 112 files during application runtime. Telemetry runtime inventory logging may detect a load event of a solution and add/update the solution entry in the inventory table with various document metadata through an application programming interface (API) 104. Telemetry runtime inventory logging may also log actual usage data (load time) as part of the inventory. In addition to the date/time, telemetry runtime inventory logging may also log solution metadata which application knows only during the runtime, such as the solution includes programmatic code, components etc. The inventory data may be used for either usage logging of a solution or upgrade risk assessment of the potential compatibility issues.

An issues list 118 may be maintained and used for presenting users errors, issue, workarounds, etc. through an advanced user interface managed by an even monitor module/application 116. The inventory agent 106, 138 may also provide records 108 to a data processing service 124 via one or more network shared folders 122. The data processing service 124 may read files in the shared folder(s) and insert them into a database managed by database server 126. The issue list 128 for a multiple computers/applications includes information on the errors and issues in human readable manner so that an administrator 132 can get context of the issues when they view it together with the telemetry data in the user interface. The administrator 132 may access the local data store of client machines 130. The analysis may be associated with inventory, usage, and/or stability of the solutions within an organization.

Figure 2:
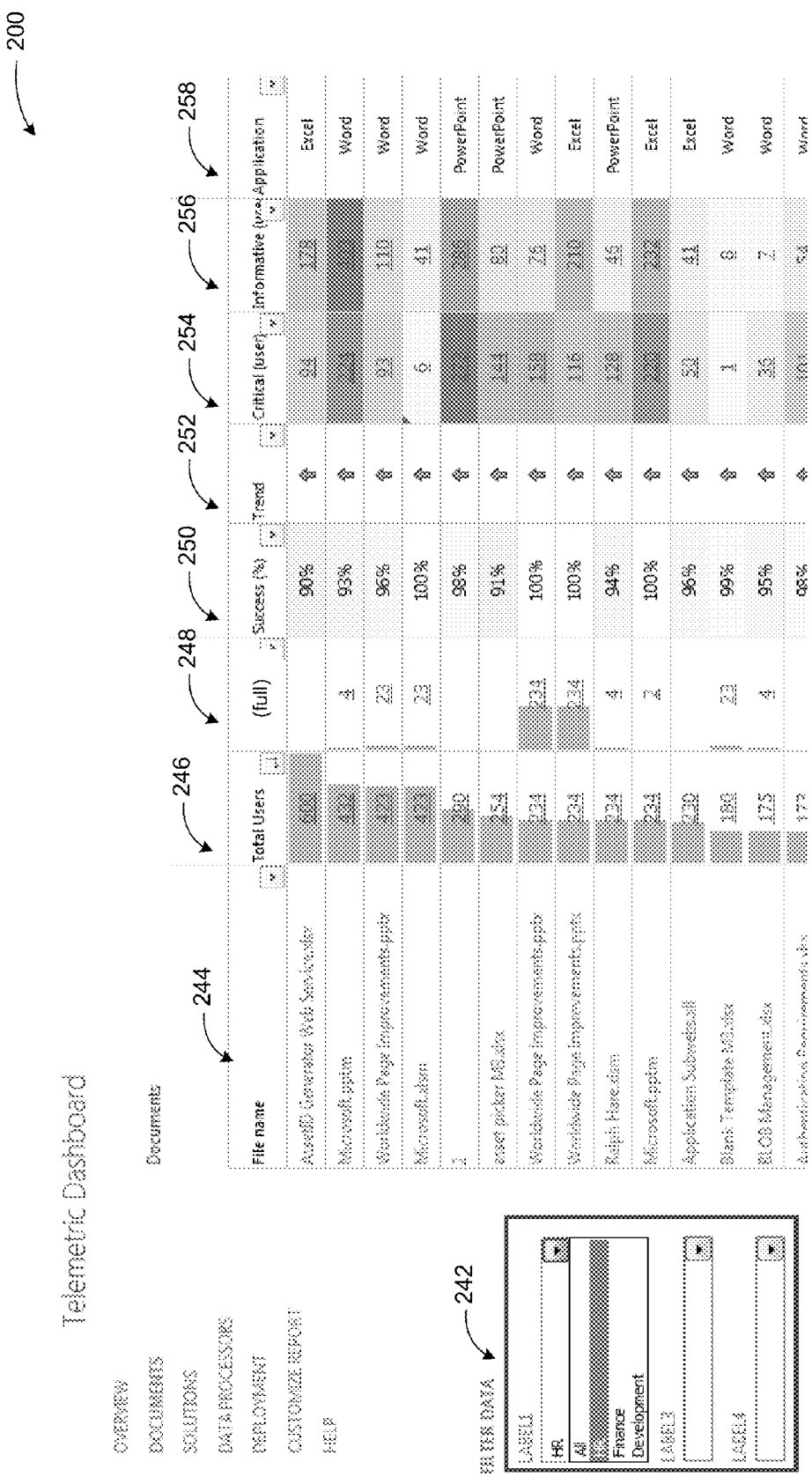
FIG. 2 illustrates a screenshot of an example telemetric dashboard, where tags can be used to organize and filter collected solution inventory data.

FIG. 2 illustrates a screenshot 200 of an example telemetric dashboard, where tags can be used to organize and filter collected solution inventory data.

A user may be tagged by any custom label (e.g. department a user belongs to, user's locations, roles, machine type, operating system, etc.) that an administrator prefers. The administrator may then organize and filter data collected from multiple users. The tags are associated with the users enable administrators to easily receive inventory for specific departments or see number of errors that specific role users experienced, etc. By using custom tags, an administrator can effectively analyze collected data.

In the example user interface screenshot 200, administrator configurable columns indicate (from left to right) files 244 (files associated with reported issues), total number of users 246 for each of the files, number of users in a particular version of a solution 248, success percentage 250, a success trend 252, critical users 254, informative users 256, and application type 258. Success percentage 250 may provide a result of the calculation of how many sessions of the solution have successfully ended without issues. Critical users 254 may provide a number of users who have exercised issues for the solution. Informative users 256 may provide a number of users who have exercised informative issues (low severity) for the solution. By assigning and selecting which tags to use, the administrator may be able to organize the collected solution inventory data and filter for desired aspects, which enables them to perform a quick analysis without complicated processes. User interface 242 is an example of how an administrator may define or select various tags through a drop box menu. Of course other forms and configurations of user interfaces such as context based menus may be employed for selecting filtering options (tags).

Events logged on a client machine may have the date/time information. Collected events from multiple client machines may be aggregated based on a solution name, date/time information. This aggregation enables an administrator to filter any set of data such as inventory, errors and compatibility issues by using a time slicer. The time slicer may provide the administrator to see what solutions are most frequently used by end users in the last year, what errors happened in the last seven days, etc. and provide control on solutions.

As discussed above a telemetry runtime error logging component may detect errors, compatibility issues on a specific solution and write them to a local data store files. The events data may be used either on a client machine to display the files and add-ins loaded, the order that the operations happened, and any detected compatibility or stability errors. The events data may also be stored to a central place for the administrator's monitoring purpose.

The telemetry runtime error logging component may log an event with the event ID/solution ID and the event may be associated with the solution ID in the solution inventory table. The description of the events may be stored in the issue list, which may be periodically updated for the latest error information, compatibility issue information, workaround information, as well as any information provided over the Internet, blogs, search results, and so on. When the telemetry runtime error logging component logs an event, the event may be associated with a solution and the description in the issue list, thus the users can see error events of a specific solution with the latest description and workaround information provided by the issue list. A single issue list may be used both for end users and administrators and may be read by user experience tools.

Figure 3:
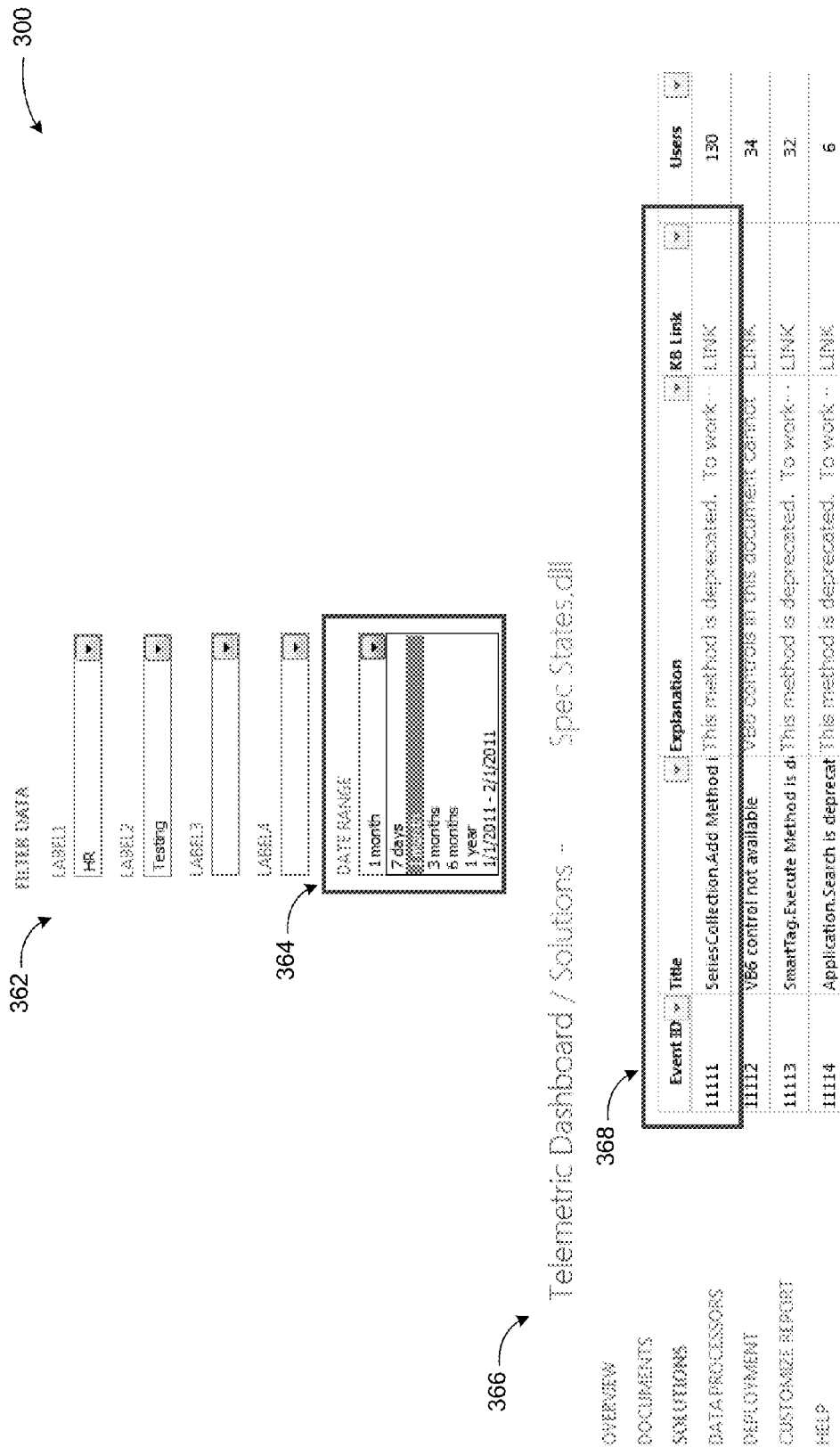
FIG. 3 illustrates a user interface for filtering data associated with solution monitoring and an example error recording as events mapped to specific solutions with detailed description defined in an issue list.

FIG. 3 illustrates a user interface for filtering data associated with solution monitoring and an example error recording as events mapped to specific solutions with detailed description defined in an issue list.

In the example telemetric dashboard interface 366 of diagram 300, an error logged as Event ID 11111 is mapped to a specific solution "Spec States.dll". The event, its identifier (11111), and the detailed description defined in the issue list may be shown on the interface 366 as emphasized by reference numeral 368.

Inventory, error, and compatibility issue events stored in the local data store files may be used on a client machine with a client tool. End users may be presented error and compatibility issues information for specific solutions and receive the latest information on the issue. They may be able to narrow down the issues and remediate them by themselves to make their solutions work continuously with a new version (e.g., in case of an upgrade).

In some example embodiments, a client user experience tool may be a spreadsheet workbook and may work as a user experience tool to show the data in the local data store files. The tool may display all events that happened on a client machine with date/time, host application, event title, workaround information, etc. so that the user can see which events happened on their solutions. In addition to the event data, the client user experience tool may display system information, installed application information, etc. Users may be enabled to share the workbook with other users to ask remediation from developers, and comparable resources.

Alternatively any dedicated application like an event viewer or other monitoring tools may be used allowing real time event monitoring by loading events, so that a user can manage which events to hide or show, and show details in a task pane. Filtering user interface 362 is another example of how users (or administrators) may be enabled to select filtering criteria such as by date range (364) for viewing collected information.

FIG. 4 illustrates an example event viewer user interface screenshot, where inventory, error, and compatibility information on a client machine is made available for end users with work-around information in an end user tool.

Screenshot 400 shows another example user tool, an event viewer application interface for presenting collected data to a user or administrator. In a spreadsheet format, date/time 472, event ID 474, application type 476, description of events 478, brief explanation about the events 480, and links to additional information 482 may be displayed in columns. The inventory agent may periodically upload inventory, error and compatibility issue events stored in the local data store files to a central place to process the data sent from multiple client machines. The data processing service installed on a server machine may collect uploaded data in a shared folder and insert them to a database. Additional machines running the data processing service may be added to increase the scale of the system to handle uploaded data from potentially hundreds of thousands of client machines and build a central database. An admin user experience may connect to a database and show analyzed data for administrators.

Figure 5:
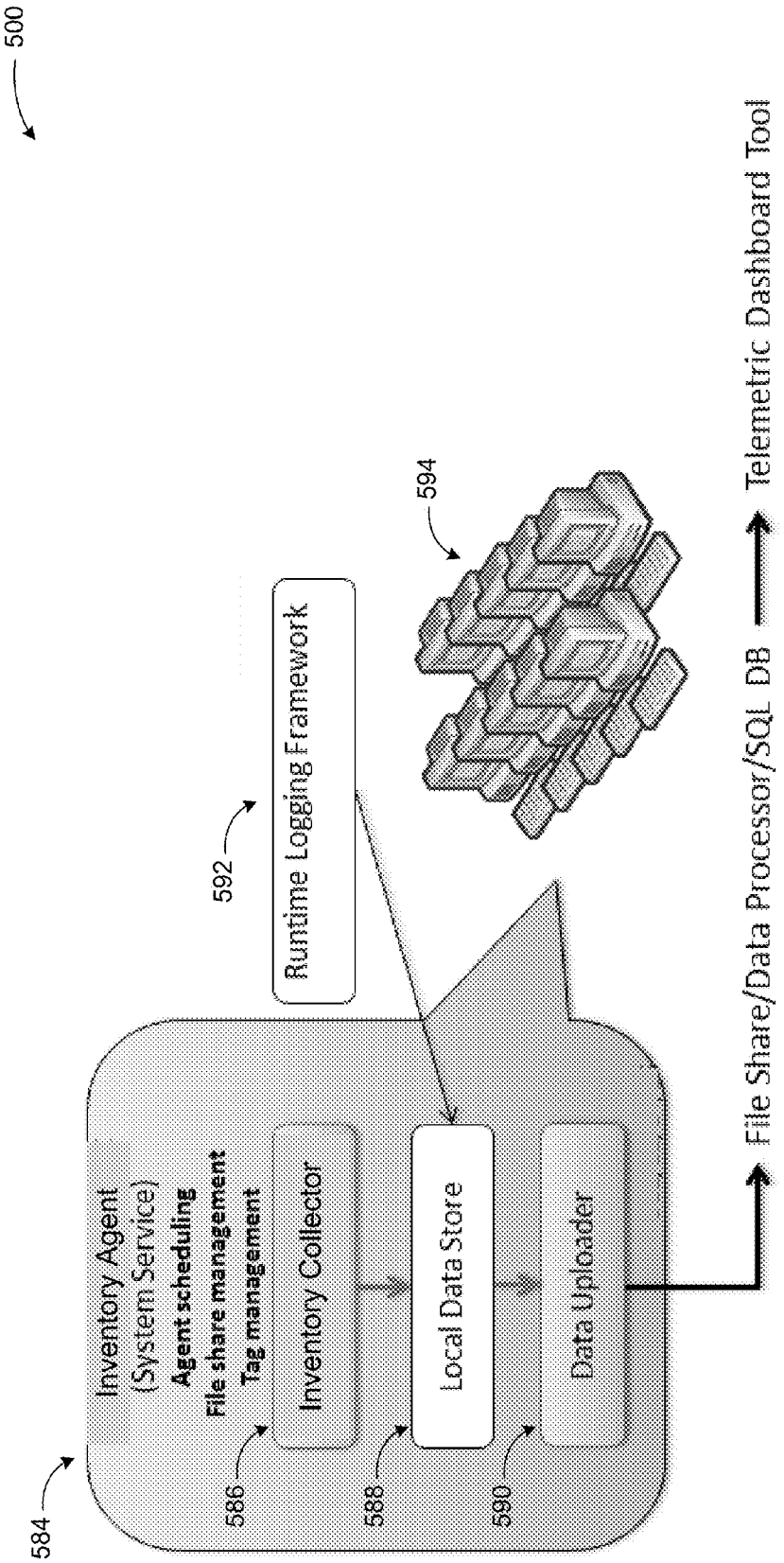
FIG. 5 illustrates an example inventory agent and its functions in collecting data for a solution monitoring system according to some embodiments.

FIG. 5 illustrates an example inventory agent and its functions in collecting data for a solution monitoring system according to some embodiments.

Diagram 500 presents an overview of operations by an inventory agent 584. As a system service, the inventory agent 584 may provide configurable services such as agent scheduling, file share management, and tag management. To provide these services, the inventory agent 584 may include an inventory collector 586 for collecting event data associated with solutions on a client machine. As discussed previously, collected data may be tagged and stored in a local data store 588, which may also be provided to a central management system through a data uploader 590. Local data store may be a place, where the agent writes solution inventory, the runtime solution inventory logging writes solution inventory, and the runtime error logging writes errors, compatibility issues, and events. The uploaded data may include various event data, which may be processed by a system data processing service and stored at a system database for review and analysis by administrators through a telemetric dashboard tool.

In a system including multiple client machines 594 (even thousands of machines), inventory agents may be installed on individual machines and event data collected from those machines may be aggregated and processed by the system data processing service. A telemetry runtime logging framework 592 may log events with event ID/solution ID in solution inventory tables in conjunction with the inventory agent 584.

As discussed above, a telemetric dashboard tool according to some embodiments may provide an inventory agent to be deployed onto client machines, where compatibility issues with a new version of a deployed solution is to be assessed and mitigated. An inventory collector service may be installed as part of the agent to scan installed applications, frequently used files, registered add-ins, etc. The agent may manage the inventory collector to execute and collect inventory information that may be sent to a centralized file share location. In the centralized location, collected inventory data across an organization may be put into the database and aggregated to help administrators to prioritize the solutions that need to be tested before an upgrade and reduce testing surface. The inventory agent 584 may be an executable component that may scan a client machine to gather solutions metadata that may be used to determine which solutions are installed on the client.

The inventory agent 584 may provide the inventory collector 586, the local data store 588, and the data uploader 590. The inventory collector 586 collects recently used document files and installed solutions and writes them to the local data store. The inventory collector 586 may search for system data, search for installed applications, search for files in the Most Frequently Used (MRU) list and collect metadata, search for files in the startup folders and collect metadata, and scan add-in entries from registry key and collect metadata. The inventory collector 586 may log scan results into the local data store. The local data store 588 may handle add/update the inventory in the store. The data uploader 590 may copy data in the local data store to a specified file share. If the share directory is unavailable, data uploader 590 may retry up to a predefined number of attempts before giving up and waiting for the next cycle. The data uploader 590 may be executed periodically or upon demand. The uploader may manage what types of data is actually uploaded. For example, administrators may want only specific data to be uploaded, or specific data not to be uploaded (e.g., administrators may want to upload only add-ins related data, but not documents data etc.), then they can control the uploader 590.

As mentioned an admin user experience tool for administrators may show the aggregated data in spreadsheet format from the system database. In the admin user experience tool, administrators may be presented with the most frequently used solutions by number of users/computers, version of installed before/after the upgrade, etc. Administrators may also be enabled to determine if the solutions keep running after the upgrade. Additional features may include use of a pivot table, filtering (e.g., using a time line slicer), and enabling a user to manage which solutions/document to show/hide. Users may not only define the most frequently used but may also change sort order to find attention needing solutions/documents which may have some issues and may be frequently used.

An example admin tool may provide an overview page with deployment status during the upgrade to show the upgrade progress, error trends on solutions so that the administrators can quickly understand the current upgrade status. The tool may further provide a list of document files and their usage data to enable determination of which document files are most frequently used in an organization, and which errors occur on which documents. The tool may also provide a list of solutions (COM add-ins, application-specific add-ins, etc.) and their usage data to enable determination of which solutions are most recently used in the organization and which errors occur on which solutions. A system according to embodiments may be scalable by adding processing servers to aggregate and process the collected inventory information depending on a number of client machines.

Figure 6:
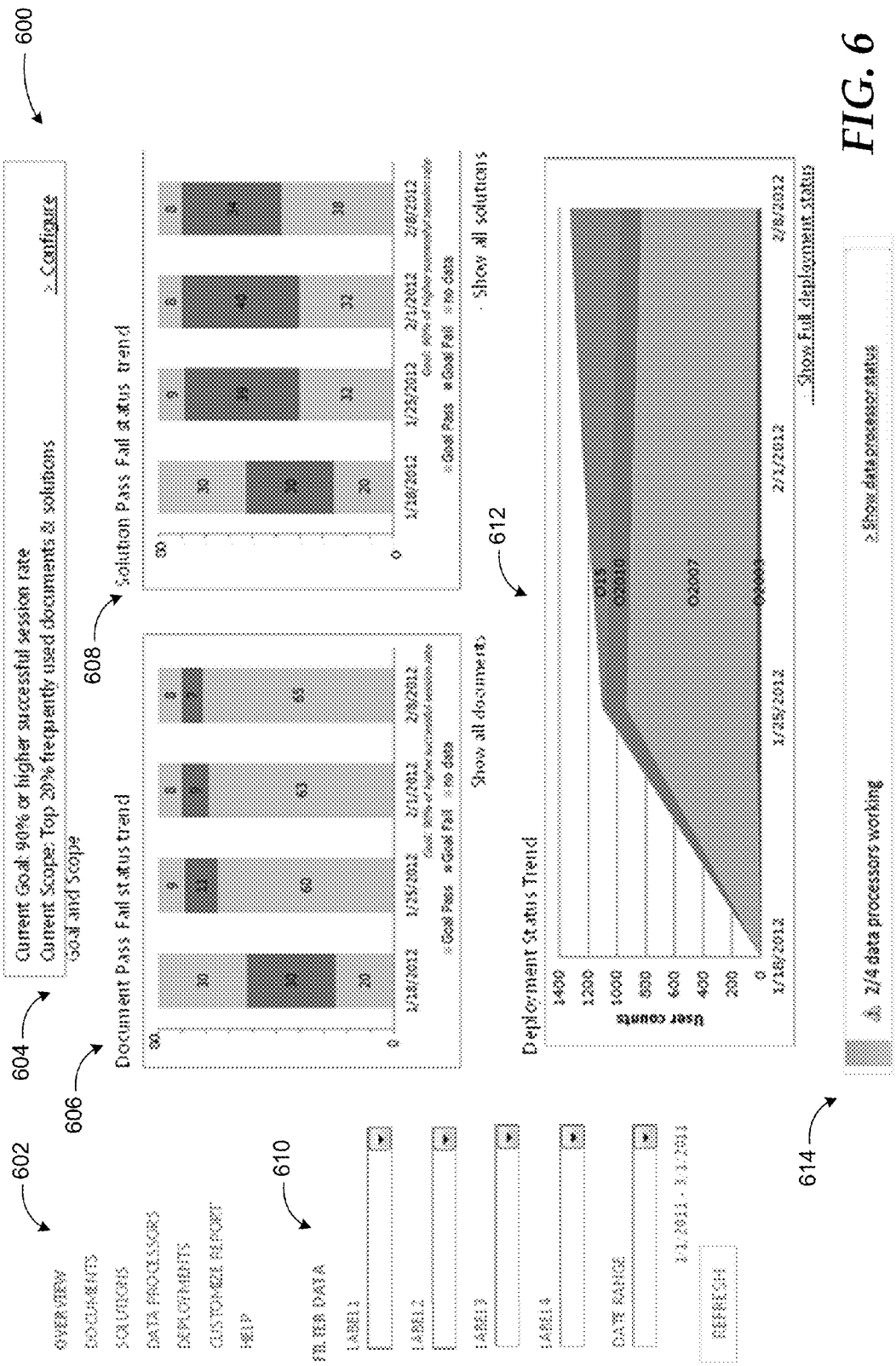
FIG. 6 illustrates another example telemetric dashboard tool user interface employing textual and graphical elements.

FIG. 6 illustrates another example telemetric dashboard tool user interface employing textual and graphical elements. While many forms and configurations may be used to provide a telemetric dashboard, the example tool in diagram 600 is an illustrative example with select elements.

In addition to a spreadsheet format or a textual format, a telemetric dashboard according to embodiments may also include graphic elements such as charts and diagrams to present inventory and analysis information associated with solutions on a monitored system. The example telemetric dashboard of diagram 600 includes selections 602 for different aspects that may be presented such as overview, documents, solutions, data processors, deployments, customized reports, etc. A top level summary 604 may display information associated with current goal(s) and scope(s) or any other information desired by an administrator about the system status. Bar, trend, line, or other charts such as charts 606, 608, and 612 may display status information such as document pass/fail trend, solution pass/fail trend, deployment status trend, etc. graphically. One or more selection menus 610 (e.g., dropdown menus) may be provided to filter the presented data based on time or tags (labels). Furthermore, summary status information 614 on active modules such as ratio of working data processors may also be presented on the user interface.

Figure 7:
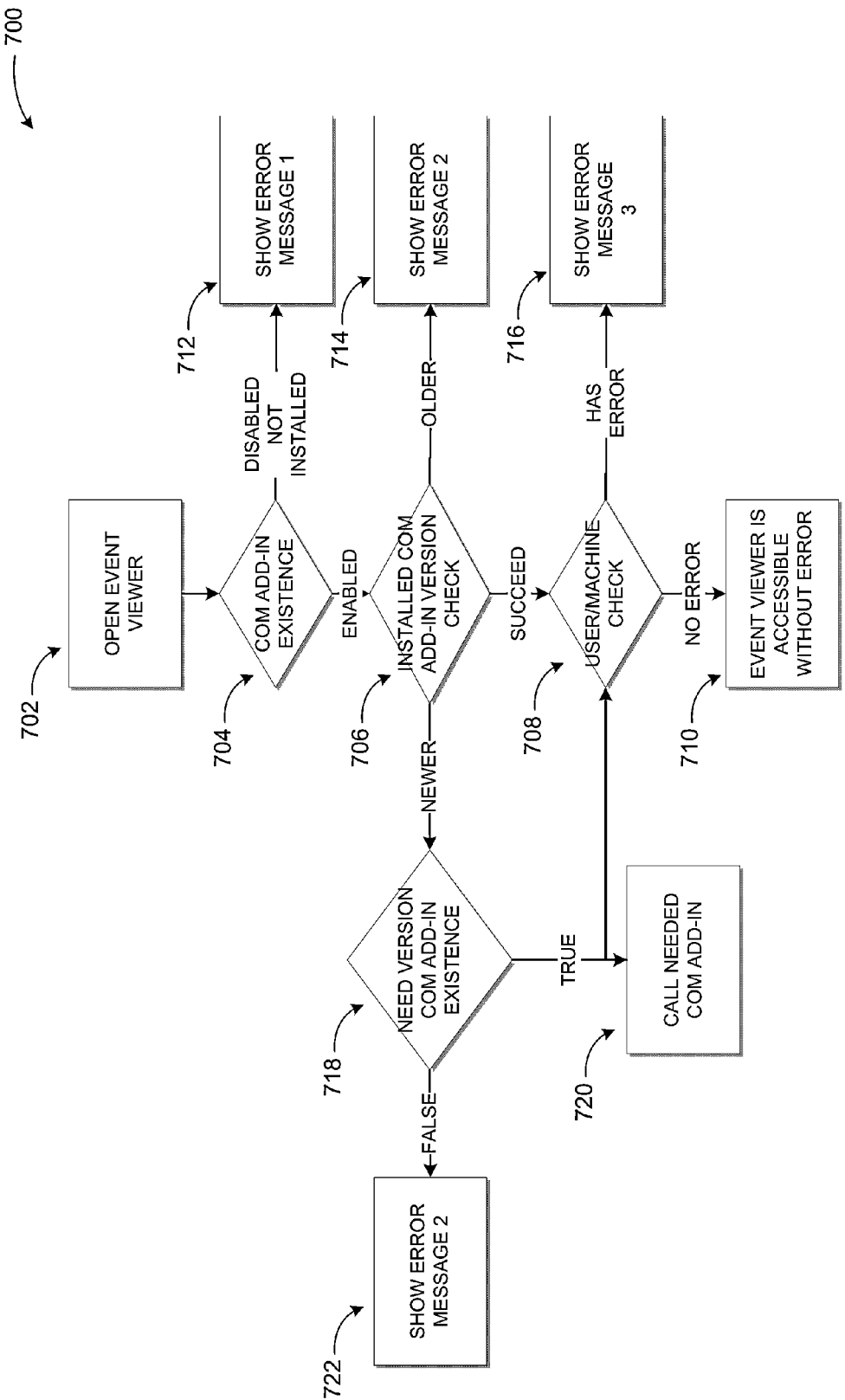
FIG. 7 illustrates another example flow of actions in a system according to some embodiments for add-in management.

FIG. 7 illustrates another example flow of actions in a system according to some embodiments for add-in management. An event viewer is one of the user interfaces that may be employed by a system according to embodiments.

Actions in an example system may begin with opening the event viewer (702), at which point existence of an add-in may be determined (704). If no add-in exists, an error message may be displayed (712). If the add-in exists (is enabled), the installed add-in's version may be determined (706). If the installed add-in's version is older than the version associated with a current version of a solution, another error message may be displayed (714). If the installed add-in's version is newer than the version associated with a current version of a solution, another check may be performed as to whether a version of the add-in is needed or not (718). If it is, the needed add-in version may be called (720) and operations proceed to a user/machine check (708). If the version of the add-in is not needed, the other error message may be displayed (722).

Upon successful determination of the installed add-in's version and/or calling of a needed add-in version, user/machine check (708) may be performed. If the user/machine are determined to have an error, a further error message may be displayed (716). If there is no error, the event viewer may be rendered accessible without error (710).

Figure 8:
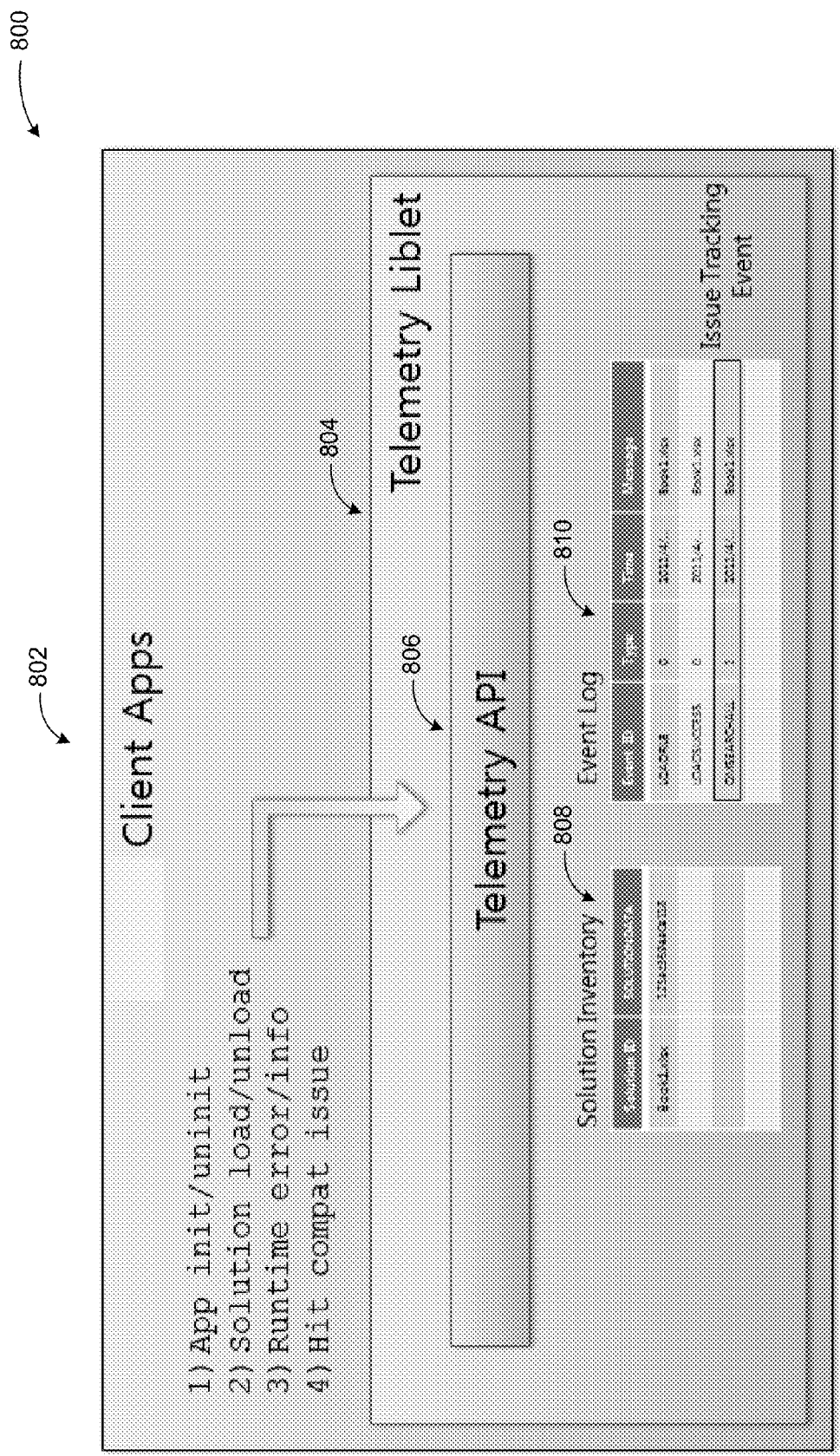
FIG. 8 illustrates an example diagram of telemetry Application Programming Interfaces (APIs)

FIG. 8 illustrates an example diagram of telemetry Application Programming Interfaces (APIs).

A telemetry logging system according to embodiments may include telemetry APIs in client applications and a storage file. The telemetry APIs such as telemetry API 806 in diagram 800 may be used inside a client application 802 code to capture events and properties related to solutions and store the data into a local storage file. The events and properties may include load/close/crash events, file name, document title, file path, author, file size, user name, computer name, domain names, load time, and/or program identifier.

A telemetry liblet 804 or similar structure containing the telemetry API 806 may also include solution inventory 808 and an event log 810 maintaining captured events and an issue tracking event. The issue tracking event is one of the telemetry APIs. Developers may add this event to the application code to capture potential compatibility issues of solutions that are found during the application development. If solution hits the event, the compatibility issue event may be captured into a local storage file. A database file (issue list) that includes the issue title, issue description and hyperlink to the online knowledge article that contains up-to-date and detailed information of the issue may also be employed. Thus, an issue list is a separate file from the local data store files and the issue list is a resource file to show various events in the local data store files as human readable information. Each entry in the database file may include an event identifier so that event viewer applications can load and display human readable information on each issue.

A framework to monitor the usage of applications' object models may be used to detect potential compatibility issues of solutions. The framework, also referred to as the object model (OM) logging framework, may monitor every usage of the object model by the solutions and if the object models with potential compatibility issues are called, it may record the compatibility issue event into a local storage file.

Figure 9:
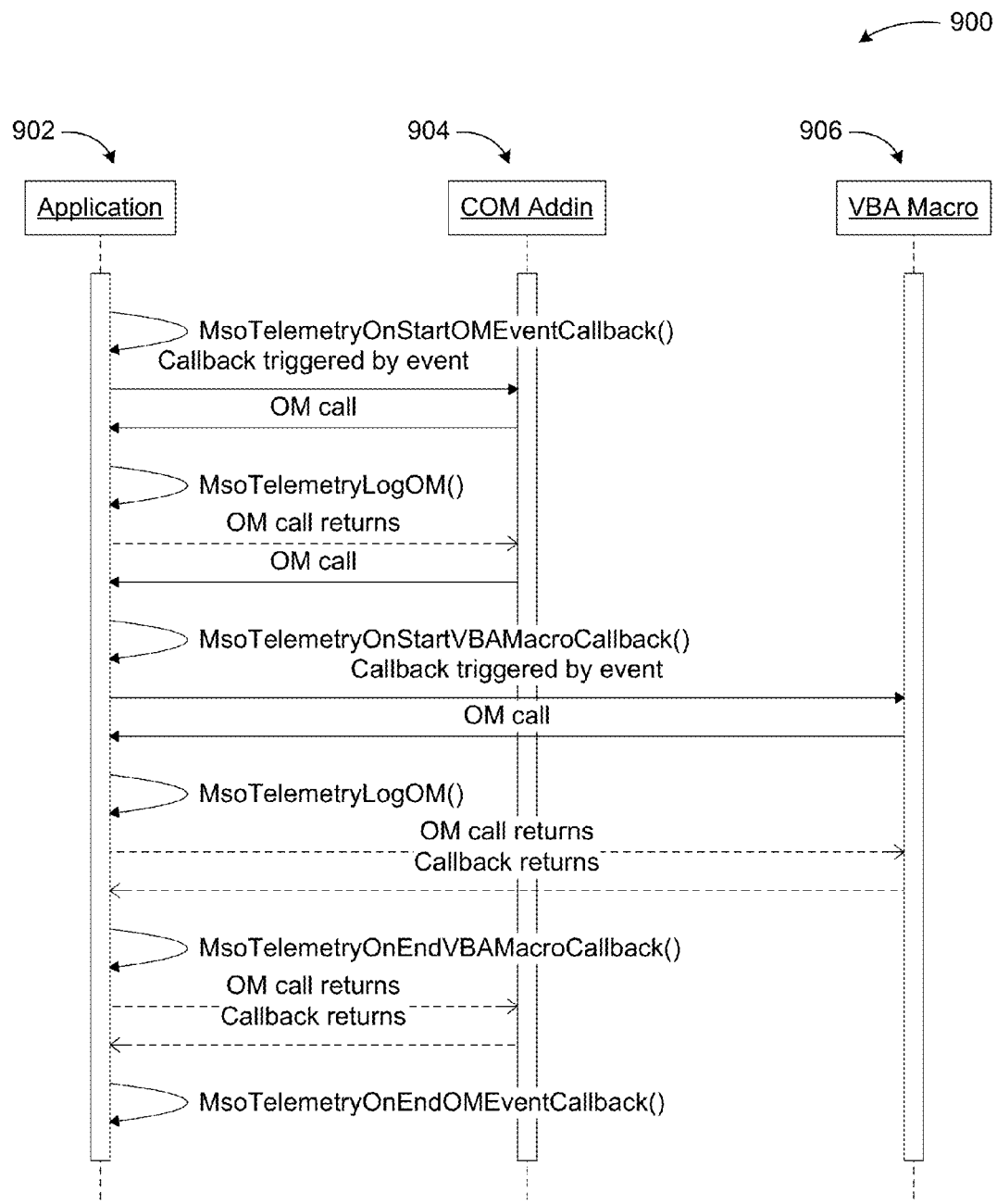
FIG. 9 illustrates a diagram of for example logic to associate events related to object models with solutions.

FIG. 9 illustrates a diagram of for example logic to associate events related to object models with solutions.

A system according to embodiments may employ a logic to associate events related to object models with solutions. When solutions first call into object models, the logic may monitor which solutions are calling and assume that any subsequent calls to object models are made by the solutions it monitors. If the compatibility issue events are logged, the logic may add the identifier of the solution that is calling in to the events, to the record.

The system may employ another logic to record solution sessions into a local storage file, which is a time spent with each solution loaded that starts with solutions load and ends with solution close. Each session may be associated with events that are related to errors or compatibility issues. Later the logic may go through the sessions for each solution to calculate the ratio of successful sessions (sessions with no errors or compatibility issues), which may be shown as an index to indicate the stability of solutions. Issue tracking events or error events may be listed in the event log viewer with a human readable title, description of the issues and link to online knowledge base article that contains more detailed and up-to-date information of the issue.

Action diagram 900 displays example interactions between application 902, add-in 904, and macro 906 (logic). An example flow of actions may start with a telemetry event upon start of monitoring followed by an object model call from the application 902 to the add-in 904. Upon return of the call, a telemetry log may be created for the event. With a telemetry event macro related event the object call may be made from the application 902 to the macro 906, where the callback is triggered by the event. Logs may be created upon receiving callback.

Figure 10:
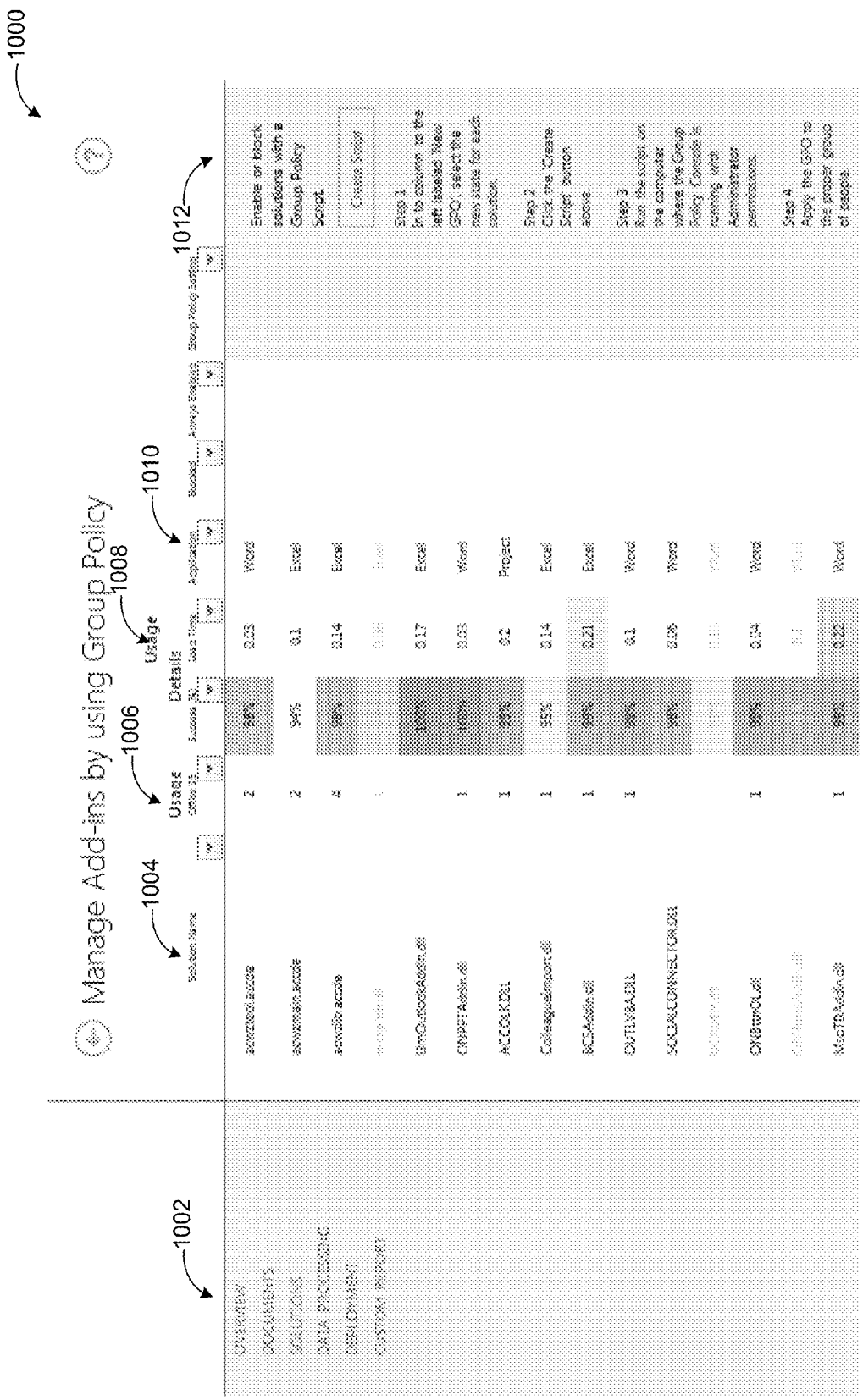
FIG. 10 illustrates a screenshot of an example user interface for managing add-ins by using group policy.

FIG. 10 illustrates a screenshot of an example user interface for managing add-ins by using group policy.

As discussed previously, a system according to embodiments may manage add-ins using registry keys. A user may be enabled to manage add-ins using registry keys. Alternatively, a user interface may be provided to display the how an add-in is being managed currently, and the user may be enabled to set add-in load behavior through the provided user interface. Furthermore, a message may be displayed when an add-in has blocked to load.

In other embodiments, add-in load performance may be collected to the local data store for the telemetric dashboard. A user interface may be provided to display the load performance. Listed add-ins may be obtained with usage/issues/ load behavior/load performance. Usage information may be collected to a central database. Collected information may be rendered on the telemetric dashboard. The dashboard may show listed add-ins with usage/issues/load behavior/load performance that may help an administrator to decide which add-in is to be managed. Thus, the administrator may easily decide which add-in should be forced to enable/block without asking individual users. Alternatively, all collected information may be stored at a web site/cloud instead of a structured file, and the user may be enabled to manage the add-in directly.

In yet other embodiments, a user can decide which add-in to manage using listed add-in usage/issues/load behavior. Based on a selection, the user may be enabled to create a script which may create a group policy object. After an administrator decides which add-in is to be managed, they may specify how to manage each add-in and generate script(s) which may create the group policy object. Created group policy object(s) may apply to their respective directory. Applied group policy object status may be shown in the telemetric dashboard. Therefore, a user does not need to note add-in name and set value through a group policy management user interface or may develop their own scripts. Alternatively, a separate user interface may be provided integrating the group policy management, so that a user can manage add-ins easily.

Screenshot 1000 of the example group policy based add-in management user interface includes a selection menu 1002 for selecting among available views such as overview, documents, solutions, data processing, deployment, etc. Detected add-ins may be listed in column 1004 with column 1006 displaying their usage (number of users using each add-in), detailed usage columns 1008 may provide additional information such as used time, success percentage, etc. Application column 1010 may display the name of the application with which each add-in is associated. Finally, a group policy setting column 1012 may enable a user/administrator to enable or block solutions with a group policy script providing a control for creating a new script.

Various examples of user interfaces and user experience tools are discussed herein. Tools for solution monitoring, managing add-ins, and similar tasks associated with embodiments may be provided through comparable user interfaces, configurations, and systems on any computing device including, but not limited to, stationary computers, mobile computers, handheld computers, and similar devices. Such devices may be touch and/or gesture enabled devices or others with keyboard/mouse/pen input, voice input, and other forms of input for interacting with the user experience tools with varying form factors and capabilities. Furthermore, different textual, graphical, color, and similar schemes may be employed in such user experience tools using the principles described herein.

Figure 11:
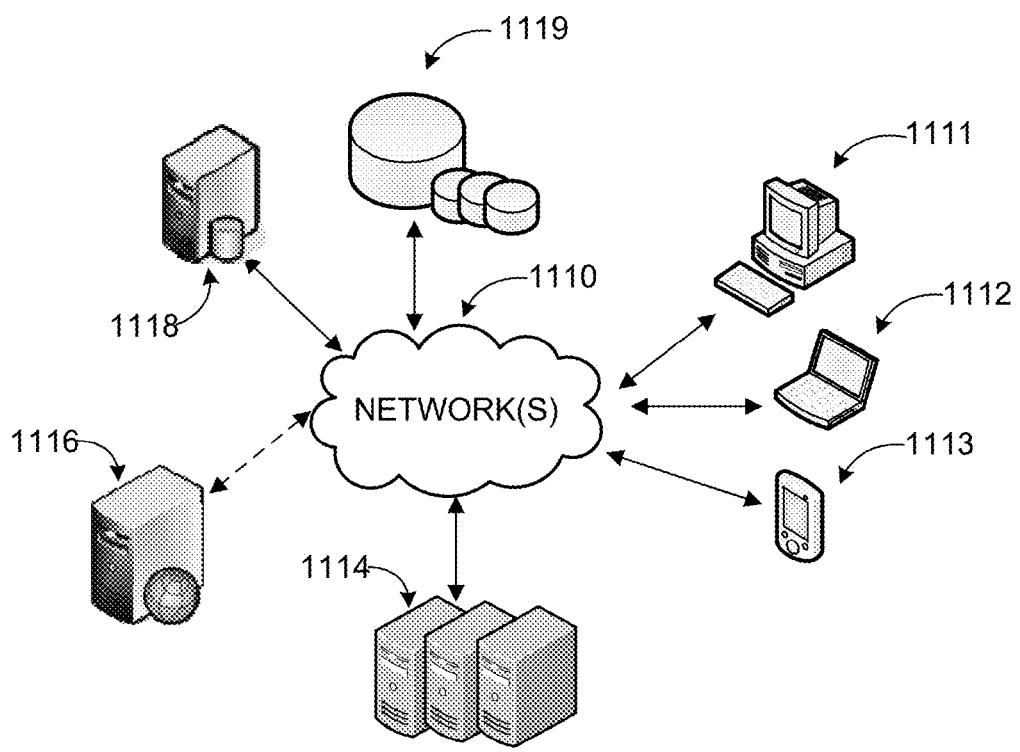
FIG. 11 is a networked environment, where a system according to embodiments may be implemented.

FIG. 11 is a networked environment, where a system according to embodiments may be implemented. In addition to locally installed applications, such as application 1222 discussed below, a solution monitoring and add-in management system according to embodiments may also be employed in conjunction with hosted applications and services that may be implemented via software executed over one or more servers 1106 or individual server 1108. A hosted service or application may communicate with client applications on individual computing devices such as a handheld computer 1101, a desktop computer 1102, a laptop computer 1103, a smart phone 1104, a tablet computer (or slate), 1105 ('client devices') through network(s) 1110 and solutions, applications, and/or add-ins.

As previously discussed, information associated with solutions may be gathered, filtered, and analyzed for managing monitoring, upgrades, and migrations. Telemetry may be recorded for various types of solution events and various properties of solutions as part of an add-in intelligence. Furthermore, add-in management tools may be provided for administrators and end users.

Client devices 1101-1105 may be used to access the functionality provided by the hosted service or application(s). One or more of the servers 1106 or server 1108 may be used to provide a variety of services as discussed above. Relevant data may be stored in one or more data stores (e.g. data store 1114), which may be managed by any one of the servers 1106 or by database server 1112.

Network(s) 1110 may comprise any topology of servers, clients, Internet service providers, and communication media. A system according to embodiments may have a static or dynamic topology. Network(s) 1110 may include a secure network such as an enterprise network, an unsecure network such as a wireless open network, or the Internet. Network(s) 1110 may also coordinate communication over other networks such as PSTN or cellular networks. Network(s) 1110 provides communication between the nodes described herein. By way of example, and not limitation, network(s) 1110 may include wireless media such as acoustic, RF, infrared and other wireless media.

Many other configurations of computing devices, applications, data sources, and data distribution systems may be employed to provide a solution monitoring system as described herein. Furthermore, the networked environments discussed in FIG. 11 are for illustration purposes only. Embodiments are not limited to the example applications, modules, or processes.

Figure 12:
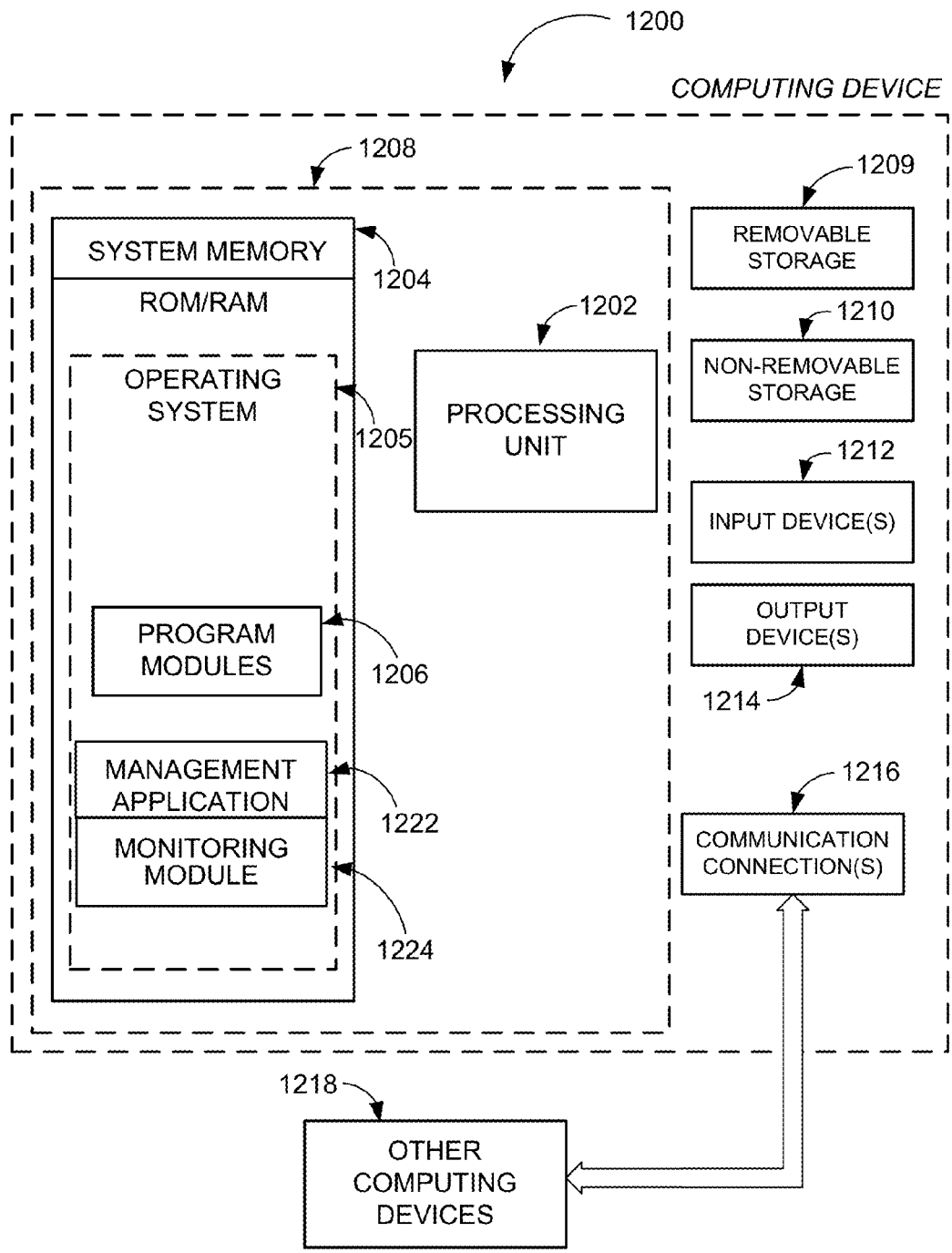
FIG. 12 is a block diagram of an example computing operating environment, where embodiments may be implemented.

FIG. 12 and the associated discussion are intended to provide a brief, general description of a suitable computing environment in which embodiments may be implemented. With reference to FIG. 12, a block diagram of an example computing operating environment according to embodiments is illustrated, such as computing device 1200. In a basic configuration, computing device 1200 may be any device in stationary, mobile, or other form for solution monitoring and add-in management, and include at least one processing unit 1202 and system memory 1204. Computing device 1200 may also include a plurality of processing units that cooperate in executing programs. Depending on the exact configuration and type of computing device, the system memory 1204 may be volatile (such as RAM), non-volatile (such as ROM, flash memory, etc.) or some combination of the two. System memory 1204 typically includes an operating system 1205 suitable for controlling the operation of the platform, such as the WINDOWS®, WINDOWS MOBILE®, or WINDOWS PHONE® operating systems from MICROSOFT CORPORATION of Redmond, Wash. The system memory 1204 may also include one or more software applications such as program modules 1206, management application 1222, and monitoring module 1224.

Monitoring module 1224 may operate in conjunction with the operating system 1205 or management application 1222 and provide services associated with monitoring solutions for upgrades or migration, as well as add-in management, event recording, analysis, and comparable tasks. This basic configuration is illustrated in FIG. 12 by those components within dashed line 1208.

Computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by removable storage 1209 and non-removable storage 1210. Computer readable storage media may include volatile and nonvolatile, removable and non-removable media implemented in any method or technology for storage of information, such as computer readable instructions, data structures, program modules, or other data. System memory 1204, removable storage 1209 and non-removable storage 1210 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer readable storage media may be part of computing device 1200. Computing device 1200 may also have input device(s) 1212 such as keyboard, mouse, pen, voice input device, touch input device, an optical capture device for detecting gestures, and comparable input devices. Output device(s) 1214 such as a display, speakers, printer, and other types of output devices may also be included. These devices are well known in the art and need not be discussed at length here.

Computing device 1200 may also contain communication connections 1216 that allow the device to communicate with other devices 1218, such as over a wireless network in a distributed computing environment, a satellite link, a cellular link, and comparable mechanisms. Other devices 1218 may include computer device(s) that execute communication applications, other servers, and comparable devices. Communication connection(s) 1216 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 13:
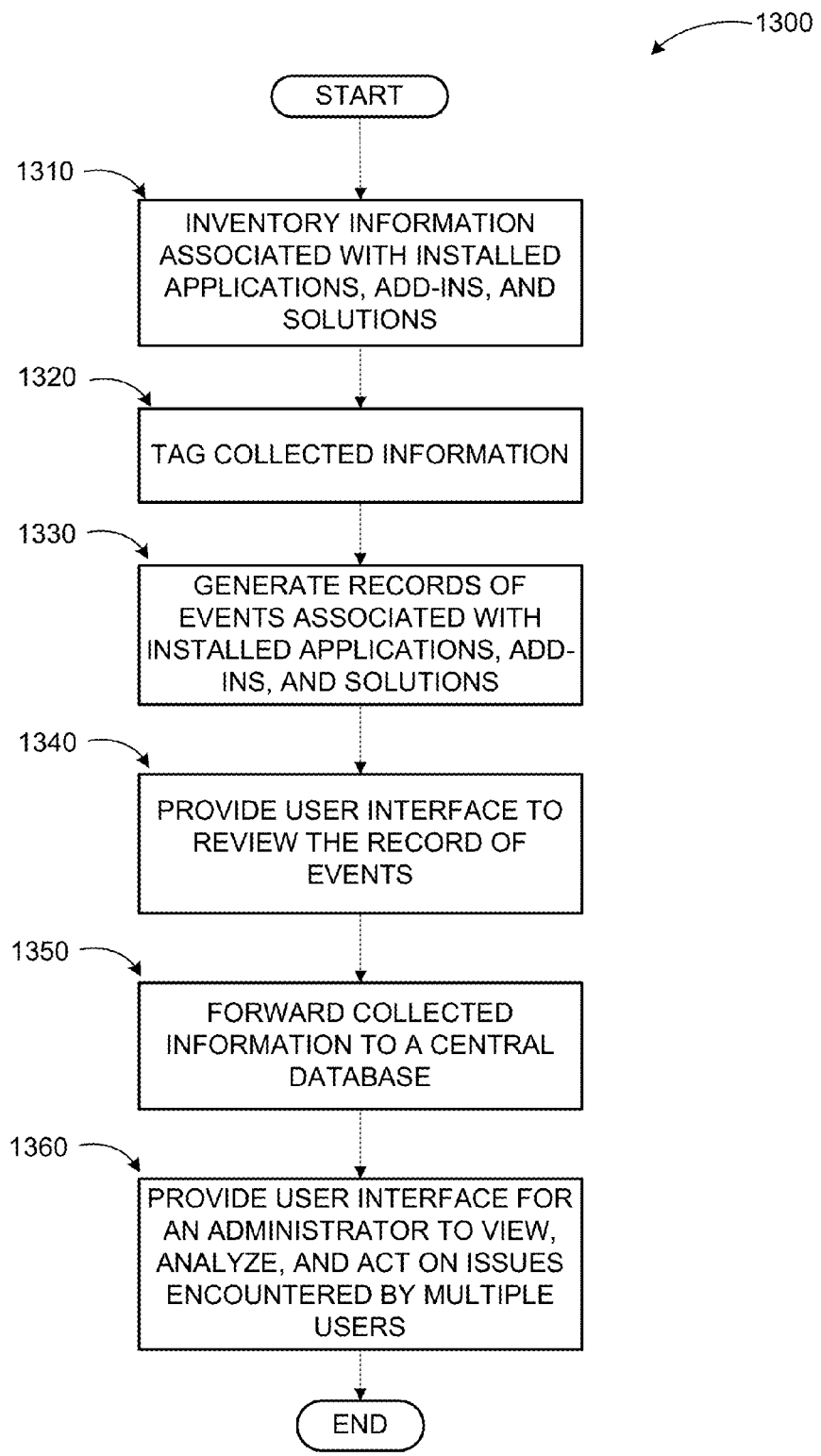
FIG. 13 illustrates a logic flow diagram for a high-level process of solution monitoring according to embodiments.

FIG. 13 illustrates a logic flow diagram for a high-level process of solution monitoring according to embodiments. Process 1300 may be implemented as part of solution monitoring application or service of any computing device in communication with other computing devices implementing the solution(s) and/or add-in(s) managed by the system.

Process 1300 begins with operation 1310, where inventory information associated with installed applications, add-ins, and solutions is collected through inventory agents on individual client machines. The collected information may be tagged with customizable tags at operation 1320 to enable users and administrators to filter the collected information and analyze it. At operation 1330, records of associated with installed applications, add-ins, and solutions may be generated through inventory agents on individual client machines. This may be followed by operation 1340, where a user interface may be provided for a user to review the record of events. The user interface may also provide information and links to address detected performance, errors, and compatibility issues. At operation 1350, the collected information may be forwarded to a central database, for example, in form of an issues list. At operation 1360, a user interface may be provided for an administrator to view, analyze, and act on issues encountered by multiple users of a system for upgrade, maintenance, and deployment purposes.

The operations included in process 1300 are for illustration purposes. Providing solution monitoring, add-in management, and add-in intelligence according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for providing solution monitoring in a multi-user system, the method comprising:
    collecting inventory information associated with installed applications, add-ins, and solutions through inventory agents on individual client machines;
    employing customizable tags to filter collected inventory information;
    generating a record associated with at least one from a set of: installed applications, add-ins, and solutions through inventory agents on individual client machines;
    providing an event viewer user interface as a user tool for a user to review a record of events;
    providing within the event viewer user interface information and links to address detected performance, errors, and compatibility issues, wherein the event viewer user interface also enables real time monitoring and management of the events through hiding or showing; and
    providing a filtering user interface as another user tool for the user to select filtering criteria to review the record of events.

2. The method of claim 1, further comprising:
    forwarding the collected inventory information to a central data store for aggregation and processing.

3. The method of claim 2, further comprising:
    providing a telemetry dashboard user interface for an administrator to review, analyze, and customize the aggregated and processed inventory information from a plurality of inventory agents.

4. The method of claim 3, further comprising:
    enabling an administrator to monitor one of an upgrade, a migration, and a maintenance of a system-wide solution through the administrator user interface.

5. The method of claim 2, further comprising:
    enabling scalability of the system by adding processing servers to aggregate and process the collected inventory information depending on a number of client machines.

6. The method of claim 1, further comprising:
    enabling filtering and analysis of the collected inventory information by selecting one or more tags.

7. The method of claim 1, further comprising:
    enabling filtering of the collected information employing a time slicer to select specific periods for viewing and analyzing the collected inventory information.

8. The method of claim 1, further comprising:
    enabling one of a user and an administrator to test and remediate one or more solutions addressing detected performance, errors, and compatibility issues.

9. The method of claim 1, further comprising:
    monitoring frequency of usage of the installed applications, add-ins, and solutions through each inventory agent.

10. The method of claim 1, further comprising:
    collecting the inventory information through a telemetry logging system, wherein the telemetry logging system includes one or more telemetry application programming interfaces (APIs) embedded within installed applications and solutions to capture events and properties.

11. The method of claim 10, further comprising storing the collected inventory information to local storage files through the telemetry APIs prior to forwarding to at least one processing server.

12. A solution monitoring system comprising:
    at least one processing server configured to aggregate and process inventory data collected from a plurality of client machines;
    a management server configured to provide an administrator tool to review and analyze the collected inventory data; and
    a telemetry logging system configured to:
    collect inventory information associated with installed applications, add-ins, and solutions through one or more telemetry application programming interfaces (APIs) embedded within installed applications and solutions to capture events and properties;
    employ customizable tags to filter collected inventory information;
    forward the collected inventory information to the at least one processing server for aggregation and processing;
    provide a telemetry dashboard user interface as the administrator tool for an administrator to review, analyze, and customize the aggregated and processed inventory information;
    provide a filtering user interface as another administrator tool for the administrator to select filtering criteria to review, analyze, and customize the aggregated and processed inventory information; and
    enable the administrator to share the aggregated and processed inventory information in a spreadsheet workbook with one or more resources in order to remediate one or more solutions addressing detected performance, errors, and compatibility issues.

13. The system of claim 12, wherein the captured events and properties include at least one from a set of: load events, close events, crash events, file names, document titles, file paths, authors, file sizes, user names, computer names, domain names, load times, and program identifiers.

14. The system of claim 12, wherein the system further comprises a framework configured to monitor usage of applications' object models to detect potential compatibility issues of the one or more solutions.

15. The system of claim 12, wherein the system further comprises logic configured to associate telemetry events with solutions and logic configured to record solution sessions and associate events with the sessions.

16. The system of claim 12, wherein the telemetry APIs are configured to store collected inventory information to local storage files prior to forwarding to the at least one processing server.

17. A computing device to provide solution monitoring in a multi-user system, the computing device comprising:
a memory;
a processor coupled to the memory, the processor executing an application in conjunction with instructions stored in the memory, wherein the application configured is configured to:
collect inventory information associated with installed applications, add-ins, and solutions through inventory agents on individual client machines;
employ customizable tags to filter the collected inventory information;
generate a record of associated with at least one from a set of: the installed applications, the add-ins, and the solutions through inventory agents on individual client machines;
provide an event viewer user interface for a user to review a record of events, wherein the event viewer user interface also provides information and links to address detected performance, errors, and compatibility issues;
provide a filtering user interface for the user to select filtering criteria to review the record of events;
forward the collected inventory information to a central data store for aggregation and processing;
provide a telemetry dashboard user interface for an administrator to review, analyze, and customize the aggregated and processed inventory information from a plurality of inventory agents;
provide a filtering user interface for the administrator to select filtering criteria to review, analyze, and customize the aggregated and processed inventory information; and
provide an add-in management user interface for the administrator to manage one or more of the add-ins using a group policy, wherein the add-in management user interface displays how the one or more of the add-ins are being managed currently, enables the administrator to one of enable and block solutions with a group policy script, and provides a control for creating the group policy script.

18. The computing device of claim 17, wherein the application is further configured to:
manage the one or more of the add-ins using registry key in individual client machines.

19. The computing device of claim 18, wherein the application is further configured to:
collect add-in performance information associated with at least one from a set of: usage, compatibility issues, and load behavior;
enable the administrator to select which of the one or more of the add-ins to manage based on the collected add-in performance information; and
enable the administrator to create a script to manage the one or more selected add-ins through a group policy object.

20. The computing device of claim 18, wherein the application is further configured to:
provide the collected add-in performance information to a user to enable the user to manage the one or more selected add-ins directly.

* * * * *